(12) United States Patent
Reukers

(10) Patent No.: US 9,212,657 B2
(45) Date of Patent: Dec. 15, 2015

(54) ULTRA HIGH PRESSURE PUMP WITH AN ALTERNATING ROTATION TO LINEAR DISPLACEMENT MECHANISM

(75) Inventor: Darren Reukers, Campbellfield (AU)

(73) Assignee: TECHNI WATERJET PTY LTD, Campbellfield (AU)

( * ) Notice: Subject to any disclaimer, the term of this patent is extended or adjusted under 35 U.S.C. 154(b) by 628 days.

(21) Appl. No.: 12/934,547

(22) PCT Filed: Mar. 24, 2009

(86) PCT No.: PCT/AU2009/000334
§ 371 (c)(1),
(2), (4) Date: Oct. 7, 2010

(87) PCT Pub. No.: WO2009/117765
PCT Pub. Date: Oct. 1, 2009

(65) Prior Publication Data
US 2011/0020155 A1   Jan. 27, 2011

(30) Foreign Application Priority Data

Mar. 26, 2008 (AU) ................................. 2008901442

(51) Int. Cl.
*F04B 9/02* (2006.01)
*B24C 9/00* (2006.01)
(Continued)

(52) U.S. Cl.
CPC ... *F04B 9/02* (2013.01); *B24C 9/00* (2013.01); *F04B 17/03* (2013.01); *H02K 7/06* (2013.01); *B26F 3/004* (2013.01)

(58) Field of Classification Search
CPC ............. H02K 7/06; H02K 7/083–7/085; H02K 7/081; F04B 9/02; F04B 17/03; F04B 1/02; F04B 1/12; F04B 23/06; B26F 3/004; F16H 2025/2078; B24C 9/00; F15B 15/06
USPC ............. 417/42, 44.2, 397, 405, 410.1, 415, 417/416, 426, 534; 310/12.14, 80, 83; 74/89.23
See application file for complete search history.

(56) References Cited

U.S. PATENT DOCUMENTS 2,245,457 A  *  6/1941  Brassell .............................. 74/57
2,913,988 A  *  11/1959  White ............................. 417/357
(Continued)

FOREIGN PATENT DOCUMENTS

| DE | 4300512 | 7/1994 |
| WO | WO 90/12962 | 11/1990 |
| WO | WO 2009/117765 | 10/2009 |

OTHER PUBLICATIONS

Written Opinion issued Jul. 6, 2009 by the International Searching Authority for Application PCT/AU2009/000334 filed Mar. 24, 2009 (Applicant—Techni Waterjet Pty Ltd // Inventor—Reukers) (9 pages).

(Continued)

*Primary Examiner* — Devon Kramer
*Assistant Examiner* — Joseph Herrmann
(74) *Attorney, Agent, or Firm* — Ballard Spahr LLP

(57) ABSTRACT

A high pressure pump including a linear actuator comprising a servo motor to axially rotate a hollow rotor shaft in alternating directions, the servo motor having a stator positioned co-axially around the hollow rotor shaft with an interior of the rotor shaft being co-axially coupled to a drive member to convert axial rotation into reciprocal displacement, the drive member being constrained against linear movement and supporting a shaft. At least one piston is coupled to the shaft and the piston is arranged within a cylinder to define a pumping chamber, whereby alternating rotation of the rotor shaft causes reciprocal linear displacement of the piston to pressurize fluid in the pumping chamber. A drive mechanism includes a controller coupled to a servomotor and an encoder to measure movement of the hollow rotor or output shaft and send a feedback signal proportional to the movement to the controller.

12 Claims, 4 Drawing Sheets

(51) Int. Cl.
  *F04B 17/03* (2006.01)
  *H02K 7/06* (2006.01)
  *B26F 3/00* (2006.01)

(56) References Cited

U.S. PATENT DOCUMENTS

| | | | | |
|---|---|---|---|---|
| 3,415,419 | A * | 12/1968 | Jewett et al. | 222/333 |
| 3,847,507 | A * | 11/1974 | Sakiyama et al. | 417/22 |
| 3,997,111 | A * | 12/1976 | Thomas et al. | 239/1 |
| 4,145,165 | A * | 3/1979 | Perkins et al. | 417/418 |
| 4,276,003 | A * | 6/1981 | Perkins et al. | 417/415 |
| 4,381,747 | A * | 5/1983 | Kobayashi | F02D 31/004 123/179.16 |
| 4,729,717 | A * | 3/1988 | Gupta | 417/5 |
| 5,130,585 | A * | 7/1992 | Iwamatsu | H02K 9/00 310/52 |
| 5,513,956 | A * | 5/1996 | Lewis et al. | 417/12 |
| 5,554,899 | A * | 9/1996 | Teramachi | B25J 9/102 310/20 |
| 5,557,154 | A * | 9/1996 | Erhart | 310/80 |
| 5,787,998 | A * | 8/1998 | O'Hanlon et al. | 175/67 |
| 5,844,335 | A * | 12/1998 | Sekiguchi | 310/75 R |
| 5,992,222 | A * | 11/1999 | Belonenko et al. | 73/61.76 |
| 6,068,448 | A * | 5/2000 | Muratsubaki et al. | 417/44.2 |
| 6,086,339 | A * | 7/2000 | Jeffrey | 417/415 |
| 6,139,288 | A | 10/2000 | Karasawa | |
| 6,230,492 | B1 * | 5/2001 | Kingston | B60T 13/745 60/545 |
| 6,398,514 | B1 * | 6/2002 | Smith et al. | 417/120 |
| 6,749,408 | B1 * | 6/2004 | Eilertsen | 417/415 |
| 8,167,591 | B1 * | 5/2012 | Sorensen | 417/469 |
| 2007/0057579 | A1 * | 3/2007 | Miyamoto | 310/12 |
| 2010/0111721 | A1 * | 5/2010 | Servin et al. | 417/321 |
| 2011/0176940 | A1 * | 7/2011 | Ellis et al. | 417/399 |
| 2013/0167697 | A1 * | 7/2013 | Reukers | 83/53 |

OTHER PUBLICATIONS

International Preliminary Report on Patentability issued Sep. 26, 2010 by the International Bureau for Application PCT/AU2009/000334 filed Mar. 24, 2009 (Applicant—Techni Waterjet Pty Ltd // Inventor—Reukers) (10 pages).
Claims amendment filed Sep. 14, 2010 with the European Patent Office for application No. 09726155.6 filed Mar. 24, 2009 (Applicant—Techni Waterjet Pty Ltd // Inventor—Reukers) (5 pages).
International Search Report. Jul. 6, 2009.

\* cited by examiner

ULTRA HIGH PRESSURE PUMP WITH AN ALTERNATING ROTATION TO LINEAR DISPLACEMENT MECHANISM

CROSS REFERENCE TO RELATED APPLICATIONS

The present application is a National Phase Application of International Application No. PCT/AU2009/000334 filed Mar. 24, 2009, and which claims priority to Australian Patent Application No. 2008901442 filed Mar. 26, 2008, which applications are incorporated herein fully by this reference.

INTRODUCTION

This invention relates to drive mechanisms including linear actuators. The invention also relates to a high pressure pump, in particular an ultra high pressure waterjet pump for use in waterjet cutting apparatus.

BACKGROUND OF THE INVENTION

Waterjet cutting apparatus has been used for some years to cut a variety of materials such as steel, aluminium, glass, marble, plastics, rubber, cork and wood. The work piece is placed over a shallow tank of water and a cutting head expelling a cutting jet is accurately displaced across the work piece to complete the desired cut. The cutting action is carried out by the combination of a very high pressure jet (up to 90,000 psi) of water entrained with fine particles of abrasive material, usually sand, that causes the cutting action. The water and sand that exit the cutting head are collected beneath the work piece in the tank.

It is in the industry associated with waterjet cutting that the expression "ultra high pressure" (UHP) waterjets are used to define a process where water is pressurised above 50000 psi and then used as a cutting tool. The high pressure water is forced through a very small hole which is typically between 0.1 mm and 0.5 mm in diameter in a jewel which is often ruby, sapphire or diamond.

Typically, two types of pumps are used to create the high pressure water, namely:
a) intensifier pumps; and
b) direct drive crank pumps.

Intensifier pumps are usually hydraulic pumps which can pressurise oil up to approximately 3000 psi. The oil is then forced into a cylinder which has a large piston attached to a smaller piston which is 1/20 the area of the hydraulic piston. The secondary piston is positioned in a cylinder which is filled with water. As the hydraulic piston is forced back and forth it forces the water piston to reciprocate creating a pressure some twenty times that of the hydraulic system. Although these systems are fairly reliably, they are inefficient due to the need to drive the hydraulic system. Typically, these pumps run at about 55% efficiency.

A more efficient pump is the direct drive crank shaft pump where a motor is coupled directly to a crank shaft. The crank shaft rotates whilst driving a number of small pistons, usually three, to reciprocate in cylinders thus pressurising the water. These pumps are fairly efficient, typically above 80%, when they are utilising the water being pressurised but they cannot store and hold pressure which means that when the waterjet apparatus is not actually cutting, the pressurised water is expelled from a release valve which means that the pumps use a similar amount of power whether sitting idle or in a cutting operation. These pumps are not as reliable as the intensifier pumps due to the high piston speed and the number of strokes required to make the same volume of ultra high pressure water.

It is the limitations of the pumps described above that have brought about the present invention.

SUMMARY OF THE INVENTION

According to one aspect of the present invention there is provided an ultra high pressure pump comprising a servo motor adapted to axially rotate a hollow rotor shaft in alternating directions, the servo motor having a stator positioned co-axially around the hollow rotor shaft with the interior of the rotor shaft being co-axially coupled to drive means to convert axial rotation into reciprocal displacement, the drive means being coupled to at least one piston having a head arranged within a cylinder to define a pumping chamber between the head of the piston and the cylinder, whereby alternating rotation of the rotor shaft causes reciprocal linear displacement of the piston to pressurise fluid in the pumping chamber.

Preferably the drive means is connected to pistons at both ends of the shaft, each piston being adapted to complete reciprocal motion within associated cylinders thus defined two pumping chambers.

Preferably the servo motor is located within a cylindrical housing that is in turn encased in a water cooling jacket. In a preferred embodiment the servo motor includes an encoder to count the frequency of rotation of the rotor shaft, the encoder being coupled to the control of the motor via a feedback loop.

Preferably the drive means comprises a linearly fixed nut that is threadedly engaged with the rotor shaft. The nut threadedly engaging a screw whereby axial rotation of the rotor shaft and rotor nut imparts reciprocal motion to the screw.

In a preferred embodiment the screw extends out each end of the pump to be coupled to the pistons.

According to another aspect of the present invention there is provided a drive mechanism comprising a controller coupled to a servo motor having a stator coaxially mounted around a hollow rotor, the hollow rotor including drive means co-axially coupled to an output shaft whereby the drive means converts rotational movement of the rotor to linear displacement of the shaft and an encoder to measure movement of the rotor or output shaft and send a feedback signal proportional to the movement to the controller.

According to a still further aspect of the present invention there is provided a linear actuator comprising a servo motor having a stator coaxially mounted around a hollow rotor, a drive member in engagement with the interior of the rotor, the drive member being constrained against linear movement and threadingly supporting a shaft to impart linear displacement of the shaft, and an encoder monitoring movement of the drive member or shaft and arranged to send a feedback signal to the servo motor whereby the operation and control of the servo motor causes controlled linear displacement of the shaft.

DESCRIPTION OF THE DRAWINGS

An embodiment of the present invention will now be described by way of example only with reference to the accompanying drawings in which.

DESCRIPTION OF THE PREFERRED EMBODIMENT

Figure 1:
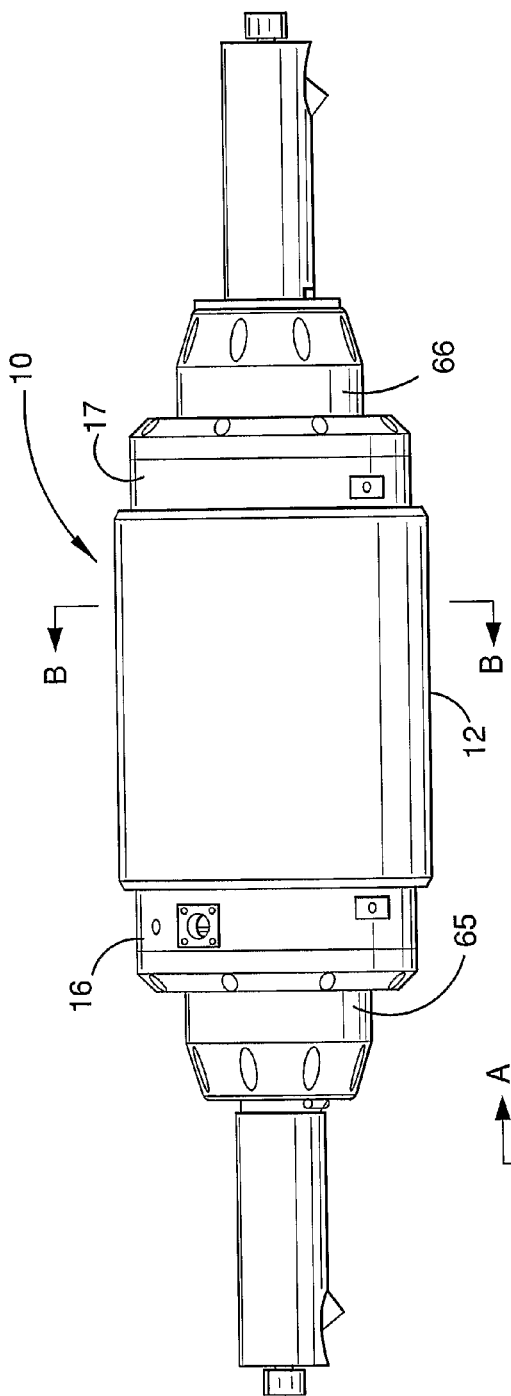
FIG. 1 is a side elevational view of an ultra high pressure pump.
Figure 2:
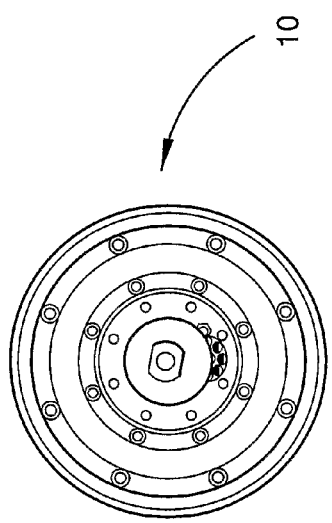
FIG. 2 is an end elevational view of the pump.
Figure 3:
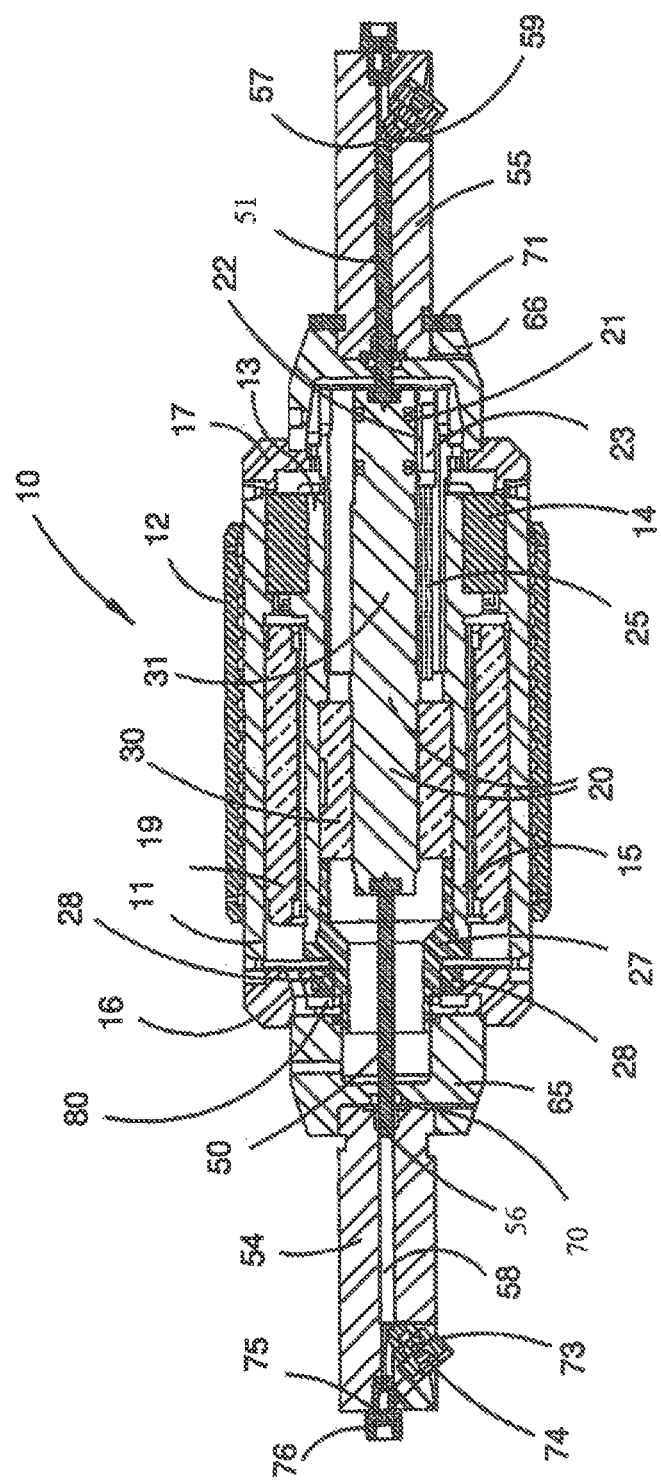
FIG. 3 is a sectional view of the pump taken along the lines A-A of FIG. 2.

Whilst the preferred embodiment relates to a high pressure pump especially for use in waterjet cutting machinery, it is understood that the invention of the subject application is, in essence, a drive mechanism which can be used in a wide variety of scenarios where close careful control of the drive is necessary. Thus one of the uses of the drive mechanism is a linear actuator that can be used to replace hydraulic cylinders, which are inherently inefficient, noisy, dirty, and not precise, in a wide variety of engineering applications such as presses, robotics, materials handling and other similar uses. It is the use of a servo motor with a closed feedback loop that provides the opportunity to closely and carefully control the drive.

When the drive mechanism is used in a pump it comprises a servo motor that drives two reciprocating pistons that project from either end of the pump to operate within cylinders to pressurise water introduced into the cylinders to pressures of greater than 50000 psi.

As shown in FIGS. 1 to 4, the pump 10 comprises a cylindrical housing 11 that is encased within a cylindrical water cooled jacket 12. The housing 11 has end flanges 16, 17 that support a hollow rotor shaft 15 about windings 19 of a servo motor. One end 13 of the rotor shaft 15 is supported by an annular bearing 14 located between the housing 11 and the shaft 15. The other end 18 of the rotor shaft 15 supports a bearing housing 27 that supports a bearing 28.

Figure 4:
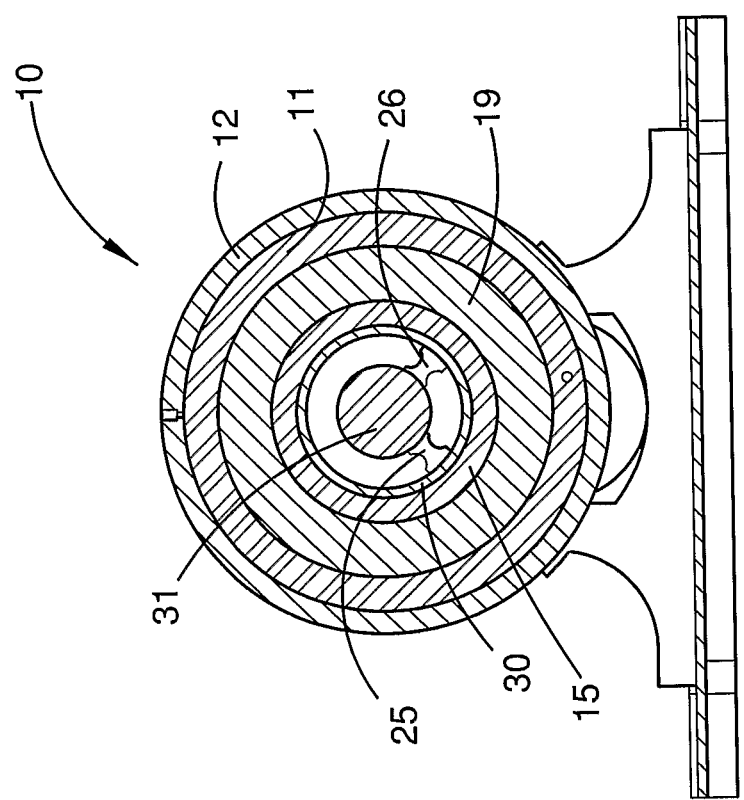
FIG. 4 is a sectional view of the pump taken along the lines B-B of FIG. 1.

The rotor shaft 15 houses a roller nut 30 which is in turn threadedly engaged onto an elongated screw 31. The roller nut 30 is in direct engagement with the interior of the shaft and is constrained against linear movement to rotate with the rotor shaft 15. The screw 31 has a threaded exterior 20 with a flat 21 machined on one end 22. The flat 21 supports linear bearings 23, 24 which run on elongate spaced apart rails 25, 26 (FIG. 4). The rails 25, 26 extend past the end flange 17 of the housing 11. The end 15 of the rotor shaft supporting the bearing 28 supports an externally positioned encoder 80.

The ends of the screw 31 are coupled to pistons 50 and 51 that are arranged to reciprocate within associated cylinders 54 and 55. The heads 56, 57 of the pistons define with the cylinders 54, 55 compression chambers 58, 59.

The rotor shaft 15 is located within the casing 11 about the spaced bearings 13 and 28 to facilitate axial rotation of the shaft 15 relative to the casing 11. The end flanges 16, 17 are bolted and secured to the casing 11 to hold the assembly together and the projecting pistons 50, 51 are enclosed within stainless steel mounts 65, 66 that support the cylinders 54, 55.

The servo motor causes the rotor shaft 15 to rotate which in turn rotates the roller nut 30 which is constrained from axial movement thus meaning that the screw 31 moves linearly within the roller nut 30. By reversing the direction of rotation of the rotor shaft 15, the screw 31 can thus be caused to reciprocate back and forth to give the reciprocating motion to the pistons 50, 51 to in turn pressurise the water that is introduced into the compression chambers 58, 59 via water inlets 60 to effect high pressure delivery of water from the outlets 61 at pressures greater than 50,000 psi.

Each cylinder 54, 55 has a low pressure water inlet 73 controlled by a check valve 74 communicating with the compression chambers 58, 59 at a 45° angle to axis of the cylinder.

A high pressure outlet 75 is positioned co-axial to the end of the cylinder and includes a check valve 76.

High pressure seals 70, 71 are positioned between the inner ends of the cylinders 54, 55 and the pistons 50, 51 to prevent back pressure.

The servo motor is controlled by a computer numerical controller (CNC).

The servo motor which is used in the preferred embodiment is a brushless DC servo motor operating on a DC voltage of about 600 volts. This is a motor which is commonly used in machine tools and has traditionally been very controllable to provide the precision which is required in such machine tool applications. The pistons have a stroke of about 175 mm and reciprocate at approximately 120 strokes per minute. The movement of a piston in one direction lasts about 0.8 seconds. The pump is designed to operate in the most efficient mode with the delivery of water at 2 L per minute but it could operate with a delivery of up to 4 L per minute though this would reduce the life of the pump.

Because there is a direct drive between the servo motor and the linear motion of the pistons it is possible to achieve extremely accurate diagnostics in the machine. By use of the encoder 80 which reads very fine graduations (typically less than 0.04 mm radially, or some 20,000 counts per revolution in the preferred embodiment), along with the current and voltage information coming back into the CNC from the stator, it is possible to accurately calculate the linear speed and the motor torque to thus very accurately determine the water pressure and flow rate. This level of accuracy is far greater then that of traditional machines. Armed with this information it is therefore possible to determine if there is a problem with the pump. It has been discovered that when high pressure leaks go unattended these leaks very quickly cause fatal damage to the very expensive machine components to the pump. By constant monitoring of the operation of the pump, seal failures can be determined very early so that preventative maintenance can be introduced to prevent serious damage to the componentry.

An issue which can cause problems with equipment of this kind is the pulsating effect caused by the reciprocation of the pistons. Every time the servo motor reverses direction, there is a delay whilst the piston stops to then reverse direction. This delay can cause as much as a 5000 psi pressure drop which tends to cause the output pressure of the pump to pulsate. The pump of the subject application can overcome this problem by placing two pumps each with two reciprocating piston and cylinder assemblies in tandem and having the pumps running slightly out of phase. By cycling one drive at twice the speed of the other, while the other pump is reversing, it allows the first pump to build up backpressure to balance the drop in pressure which would be caused through reversal of the piston and thus ensure that the output pressure delivered to the waterjet cutter is constant without pulsing. By doing away with the pulsing effect, the main contributor to early fatigue of the components in the waterjet cutting machine is avoided.

The servo drive pump described above is far more efficient than an intensifier pump while still offering the desired ability to be able to store and hold pressure while not cutting, thus using only minimal power. The rotor shaft is designed to run at about 1500 rpm and the piston is about 180 mm in length running in a bore with a head diameter of 14 mm. This makes the whole assembly small, light and considerably quieter than an intensifier pump. The servo drive system is also very responsive and pressures can be adjusted within milliseconds with infinite control.

Figure 5:
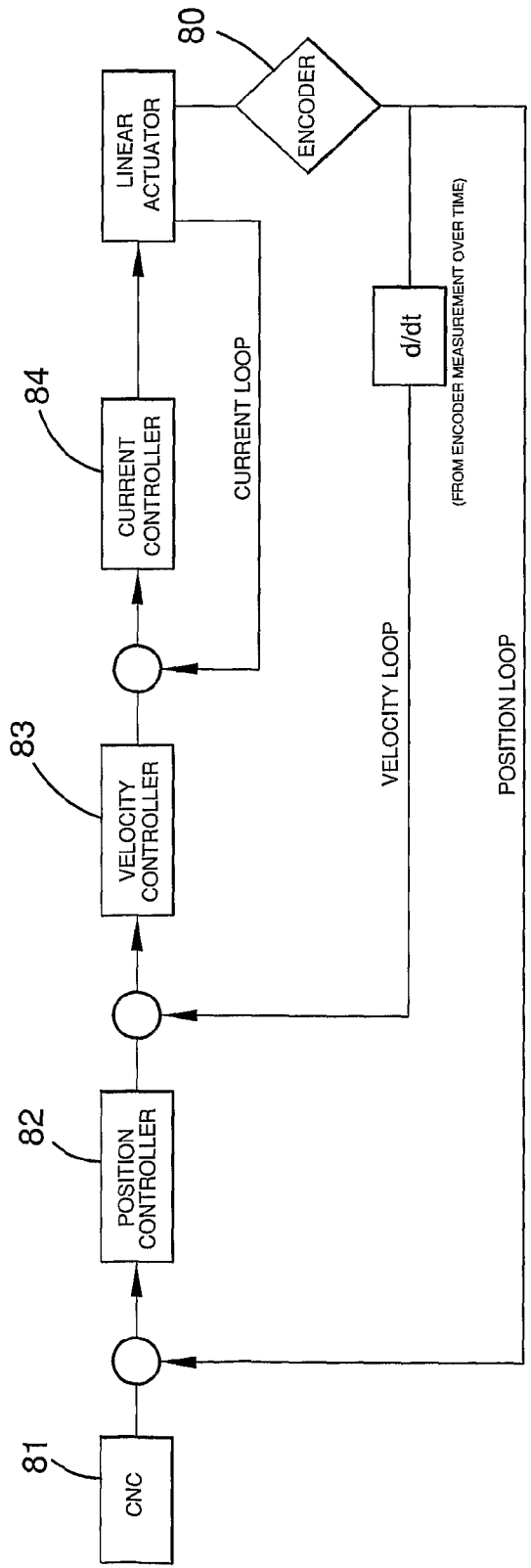
FIG. 5 is a diagram illustrating the feedback loop for a linear actuator.

The drive mechanism described above which is used in the embodiment shown in FIGS. 1 to 4 to drive an ultra high pressure pump can also be used in a number of other environments and has particular use as a linear actuator. FIG. 5 is an illustration of a closed loop showing the control of a linear actuator. The computer numerical controller 81 drives a position controller 82 that in turn is coupled to a velocity controller 83 which in turn is coupled to a current controller 84 to drive the servo motor which becomes the linear actuator. The encoder 80 sends two feedback signals, namely a velocity feedback signal that is fed to the velocity controller and a position feedback signal that is fed to the position controller. In this manner the computer controlling operation of the servo motor by monitoring the feedback signals provides an extremely positive and accurate control of the linear displacement of the output shaft which means that the linear actuator can be used to replace the hydraulic cylinders conventionally used in applications such as heavy duty presses, injection moulding machines, lifting tables and platforms or high load cutting or polishing machines. The linear actuator is particularly compact and thus is especially useful where there is a need for increased control of speed, position or force and limited space is available.

The claims defining the invention are as follows:

1. An ultra-high pressure pump for water jet cutting apparatus comprising:
   a motor adapted to axially rotate a hollow rotor shaft in alternating directions, wherein one end of the hollow rotor shaft is supported by an annular bearing, the motor comprising:
      a stator positioned co-axially around the hollow rotor shaft, the hollow rotor shaft having an interior co-axially coupled to a nut that is linearly fixed within the hollow rotor shaft, the nut threadedly engaged with a screw, the screw being engaged with a linear motion bearing, wherein the linear motion bearing prevents rotation of the screw and facilitates longitudinal movement of the screw, the linear motion bearing housed substantially within at least one of the hollow rotor shaft and the annular bearing, whereby axial rotation of the hollow rotor shaft and therefore the nut, imparts linear motion to the screw;
   an encoder to monitor movement of the rotor shaft;
   a pair of pistons, each piston having a head arranged within a cylinder to define pumping chambers of equal volume at opposed ends of the screw,
   wherein one piston is coupled to one end of the screw and the other piston is coupled to the other end of the screw, wherein, in operation, the alternating rotation of the hollow rotor shaft causes reciprocal linear displacement of the pair of pistons to pressurize water in each pumping chamber to equal pressures greater than 50,000 psi, and expelling the pressurized water on each stroke with a delivery of between 0.5 and 1 gallon per minute.

2. The ultra-high pressure pump according to claim 1, wherein the encoder transmits a velocity feedback signal and/or a position feedback signal.

3. The ultra-high pressure pump according to claim 1, wherein the stator is located within a cylindrical housing.

4. The ultra-high pressure pump according to claim 3, wherein the housing is encased in a water cooled jacket.

5. The ultra-high pressure pump according to claim 4, wherein the housing, water cooled jacket, stator, hollow rotor shaft, and nut are all coaxial.

6. The ultra-high pressure pump according to claim 1, wherein the linear motion bearing engaged with the screw is defined by linear bearings each of which are supported on an elongate rail.

7. The ultra-high pressure pump according to claim 6, wherein one end of the screw has opposed flats that engage the linear bearings.

8. The ultra-high pressure pump according to claim 1, wherein each cylinder has a low pressure water inlet controlled by a low pressure check valve and a high pressure outlet controlled by a high pressure check valve.

9. The ultra-high pressure pump according to claim 8, wherein the pistons have inner ends, and high pressure seals are positioned between the inner ends of the pistons and the cylinders.

10. The ultra-high pressure pump according to claim 9, wherein each piston has a stroke of about 7 inches and reciprocates at between 75 to 120 strokes per minute.

11. A pump assembly for a water jet cutting apparatus comprising two pumps, wherein each pump comprises:
   a motor adapted to axially rotate a hollow rotor shaft in alternating directions, wherein one end of the hollow rotor shaft is supported by an annular bearing, the motor comprising:
      a stator positioned co-axially around the hollow rotor shaft, the hollow rotor shaft having an interior co-axially coupled to a nut that is linearly fixed within the hollow rotor shaft, the nut threadedly engaged with a screw, the screw being engaged with a linear motion bearing, wherein the linear motion bearing prevents rotation of the screw and facilitates longitudinal movement of the screw, the linear motion bearing housed substantially within at least one of the hollow rotor shaft and the annular bearing, whereby axial rotation of the hollow rotor shaft and therefore the nut, imparts linear motion to the screw;
   an encoder to monitor movement of the rotor shaft;
   a pair of pistons, each piston having a head arranged within a cylinder to define pumping chambers of equal volume at opposed ends of the screw, wherein one piston is coupled to one end of the screw and the other piston is coupled to the other end of the screw,
   wherein, in operation, the alternating rotation of the hollow rotor shaft causes reciprocal linear displacement of the pair of pistons to pressurize water in each pumping chamber to equal pressures greater than 50,000 psi, and expelling the pressurized water on each stroke with a delivery of between 0.5 and 1 gallon per minute
   wherein the two pumps are coupled together in the pump assembly to produce an ultra-high pressure jet of water, the reciprocation of the two pumps in the pump assembly being out of phase to reduce pulsing of the water pressure.

12. The pump assembly according to claim 11, wherein each of the two pumps operate at a speed and wherein one pump operates at a speed which is greater than the speed of the other pump to compensate for the other pump while reversing.

* * * * *